United States Patent [19]

Schulz

[11] Patent Number: 4,927,588

[45] Date of Patent: May 22, 1990

[54] METHOD MULTI-PLY EMBOSSED FIBROUS SHEET

[75] Inventor: Galyn A. Schulz, Appleton, Wis.

[73] Assignee: James River Corporation of Virginia, Norwalk, Conn.

[21] Appl. No.: 198,146

[22] Filed: May 24, 1988

[51] Int. Cl.[5] .......................... B29C 59/04; B32B 31/20

[52] U.S. Cl. .......................... 264/258; 156/152; 156/183; 156/209; 162/112; 162/117; 264/282; 264/284

[58] Field of Search .......................... 156/183, 152, 209; 162/111, 112, 113, 117; 264/282, 283, 284, 258; 428/153, 154, 156

[56] References Cited

U.S. PATENT DOCUMENTS

| | | | |
|---|---|---|---|
| 1,964,700 | 6/1934 | Winter et al. | 264/283 |
| 2,177,490 | 10/1939 | Kieffer | 156/183 |
| 3,684,603 | 8/1972 | Iltis | 156/183 |
| 4,100,017 | 7/1978 | Flautt, Jr. | 162/113 |
| 4,659,608 | 4/1987 | Schulz | 428/187 |

*Primary Examiner*—James Lowe
*Attorney, Agent, or Firm*—William A. Aguele; Richard J. Gallagher; Thomas H. Whaley

[57] ABSTRACT

A method and apparatus is disclosed for the production of a multi-ply sheet product in which separate non-woven fibrous webs are combined into a multi-ply sheet before embossment, embossed as a multi-ply sheet, the embossed webs separated from one another and longitudinally displaced relative to one another, and then recombined into an embossed multi-ply sheet with the embossments out of register with one another. The resulting product exhibits enhanced softness and absorbence as compared with similar products comprising simultaneously embossed multi-ply webs.

4 Claims, 1 Drawing Sheet

METHOD MULTI-PLY EMBOSSED FIBROUS SHEET

This invention relates to improvements in the manufacture of multi-ply fibrous sheet structures. In one of its more specific aspects, this invention relates to a method and apparatus for the production of soft, absorbent multi-ply embossed sheets and to the product produced thereby. In a specific example, a plurality of unembossed non-woven fibrous webs is simultaneously embossed in a single embossing nip; the embossed webs are separated from one another, displaced relative to one another in a longitudinal direction and recombined into a multi-ply sheet of exceptional softness. The method and apparatus of this invention are especially applicable to the production of multi-ply sheet products including toilet tissue and paper towels normally sold in rolls. Embossing the non-fibrous web by the method of this invention results in improvements in absorbency and softness of the product sheets and in a firm, uniform and attractive roll package.

BACKGROUND OF THE INVENTION

It is already known in the art to emboss sheets comprising multiple plies of creped tissue to increase the surface area of the sheets thereby enhancing their bulk and water holding capacity. Paper towels and toilet tissue are usually marketed in rolls containing a specified number of sheets per roll. Paper towels or tissue embossed in conventional patterns of spot embossments, when packaged in roll form, exhibit a tendency to be non-uniform in appearance due to the tendency for ridges to form on the roll along the lines of the bosses as the sheet is wound onto the roll.

Embossment patterns typical of conventional products have a tendency to cause nesting of some of the bosses and stacking of others when the embossed tissue rolled on a hollow core or mandrel. The so-called line patterns, e.g. the pattern illustrated in U.S. Pat. No. Des. 242,579 are especially prone to nesting of the bosses in the product roll whereas dissimilar patterns tend to pile up on top of one another. Since the appearance of a roll of toilet tissue or paper towels is an important attribute suggestive of quality of the product, as well as its softness and absorbency, it is most desirable to avoid resulting nonuniformity of rolls of product, especially those products sold to individual consumers in supermarkets.

It has been proposed heretofore to emboss paper products to avoid nesting of the bosses in rolled, folded, or stacked sheets of paper products by various means including embossing the sheet with bosses of varying configurations, e.g. as in U.S. No. Des. 230,311 or alternating sheets or strips embossed with one pattern with sheets or strips embossed with another pattern, or alternating embossing patterns on a single strip, e.g. U.S. Nos. 1,863,973; 2,177,490; and 2,284,663.

Such fibrous sheet products, generally termed non-woven fibrous webs, when produced on a paper making machine are non-uniform in tensile strength, having a greater tensile strength in the machine direction than in the cross-machine direction. When rolled, a strip of the sheet material is wound onto a mandrel or hollow core in the machine direction with perforations in the cross-machine direction to facilitate tearing off sheets from the strip. Conventionally, rolls of paper toweling and toilet tissue are perforated to produce an approximately square sheet when separated into individual sheets at the perforations.

When the sheets or webs are embossed, the embossment most frequently comprises repetitive parallel rows of identical or alternating boss patterns arranged in the cross-machine direction perpendicular to the machine direction. The boss patterns are also in alignment with one another in the machine direction, with identical bosses appearing either in adjacent cross-machine rows or in alternate rows once or twice removed. Alignment of bosses in the machine direction frequently causes 'ridging' of the roll product detracting from its appearance. While alternating the patterns of individual bosses reduces the nesting of the bosses in the finished roll products, the expense of the machine embossing roll necessary to produce such patterns of embossment is considerably increased. This invention provides a solution to the above-mentioned problems by providing a method of embossing with identical bosses while avoiding both ridging and nesting of bosses in the rolled product.

By the method of embossment disclosed in U.S. Pat. No. 4,659,608, incorporated herein by reference, it is possible to produce paper toweling and toilet tissue and rolls of product produced therefrom by embossing a pattern of uniformly spaced identical bosses in angular rows on a continuous sheet or strip of non-woven fibrous webs of the towel and tissue type. Embossing in this manner enhances the absorbency and softness of the sheet and results in a spiral wound roll package of improved uniformity and appearance.

The method disclosed herein of embossing such fibrous web products avoids many of the problems associated with prior art methods and the products so produced. In one specific preferred embodiment of this invention, the method of embossing fibrous webs disclosed in my issued U.S. Pat. No. 4,659,608 is combined with the method disclosed herein to produce a multi-ply tissue of enhanced bulk, softness and absorbency.

SUMMARY OF THE INVENTION

In accordance with this invention, a multi-ply embossed towel or tissue product is provided by first combining separate unembossed fibrous webs into a multi-ply sheet. The multi-ply sheet is then passed through embossing rolls which simultaneously emboss the webs making up the sheet. The embossed webs are separated from one another, displaced relative to one another in a longitudinal direction and recombined into a single multi-ply sheet of enhanced softness.

BRIEF DESCRIPTION OF THE DRAWINGS

The invention will be more readily understood with reference to the accompanying drawings wherein.

DESCRIPTION OF THE PREFERRED EMBODIMENTS

Figure 1:
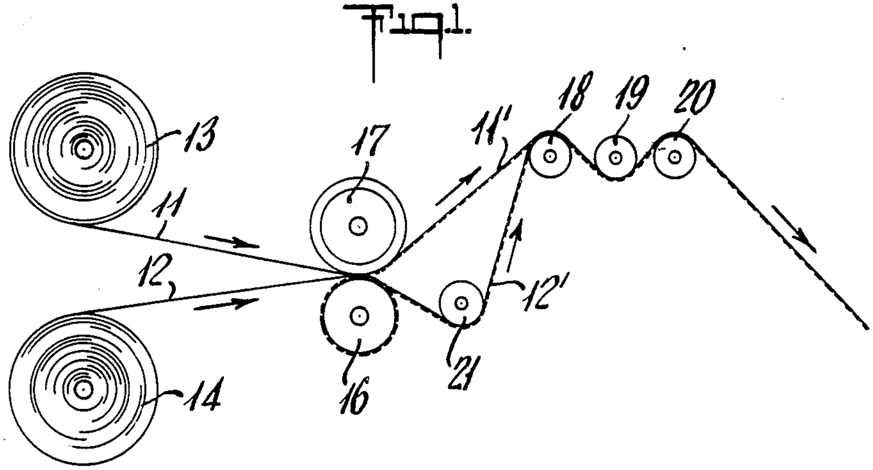
FIG. 1 is a diagrammatic elevational view illustrating the basic elements of apparatus for carrying out the method of this invention.

With reference to FIG. 1 of the drawings, webs or plies 11 and 12 of creped tissue stock suitable for use in multi-ply bathroom tissue products are drawn from supply rolls 13 and 14 and fed into the nip of embossing roll 16 and back up impression roll 17 where the webs are embossed simultaneously. The embossing roll typically has a steel surface provided with a plurality of engraved raised embossing elements. In a specific preferred embodiment, the embossing elements of roll 16 are essentially those disclosed in U.S. Pat. No. 4,659,608 wherein each design is made up of several embossing elements, each of which comprise lands about 0.02 inch wide and about 0.06 inch deep with sides of the lands sloped inwardly from bottom to top at an angle of about 25° relative to the radii of the roll. Each design pattern measures about one inch in its longest dimension and about three quarters of an inch in its narrowest dimension. In this preferred embodiment, the patterns are spaced apart about one quarter inch. A resilient back up roll 17 of rubber or similar material permits deep clean embossments in the tissue without rupturing the tissue.

Figure 2:
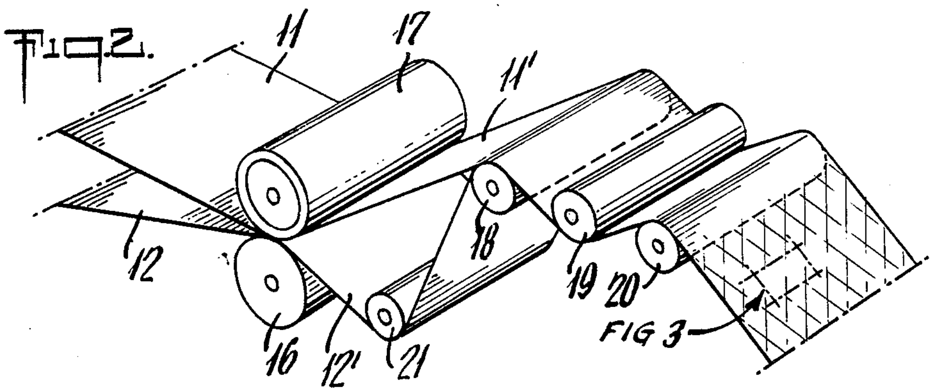
FIG. 2 is a perspective view illustrating operation of the apparatus of FIG. 1
Figure 3:
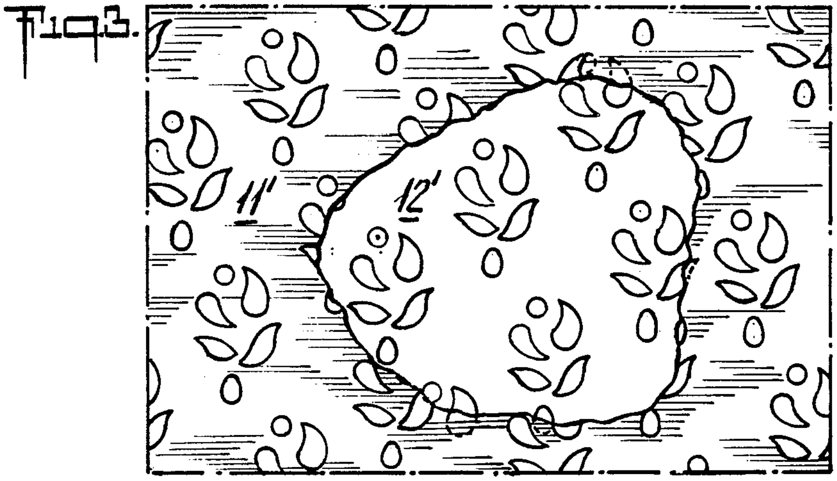
FIG. 3 is a fragmented view of a section of the two ply embossed web of FIGS. 1 and 2.

In the method of this invention, unlike any of the prior art with which I am familiar, the plies of the multi-ply embossed sheet formed by the embossing roll 16 and its back up roll 17 are separated from one another after embossing. In the apparatus illustrated in the drawings, embossed web 11', after leaving the embossing roll, is passed directly to the first of the in-feed rolls 18, 19, 20, whereas embossed web 12' passes first over roll 21 before rejoining web 11' at in-feed roll 18. As illustrated in FIG. 2, idler roll 21 serves not only as a positive means for separation of the embossed webs 11' and 12' but also serves to displace web 12' relative to web 11' in the longitudinal or machine direction. By displacing the embossed webs relative to one another, the originally nested bosses are so displaced relative to one another as to preclude nesting with one another as illustrated in FIG. 3. The extent to which the web 12' is longitudinally displaced relative to web 11' is determined by the relative lengths of the paths of the webs during their passage from embossing roll 16 to in-feed roll 18. The extent of displacement is easily adjusted to suit the particular embossment pattern by changing the position of the idler roll 21 relative to the path of web 11' to shorten or lengthen the path of web 12' in passing from the embossing roll to the in-feed rolls.

After the embossed webs have been recombined at rolls 18, 19, and 20, the resulting multi-ply product is perforated by conventional perforating rolls (not illustrated).

Typical two-ply bathroom tissue is formed by first joining two webs of creped tissue and then embossing both webs simultaneously. The caliper of the resultant product may be tested on a TMI Special Model 551-M motorized micrometer available from Testing Machines Incorporated, Amityville, N.Y. Eight two-ply sheets are interposed as a stack between parallel, two-inch diameter anvils and subjected to 539±30 grams dead weight load. Using this test method, two ply bathroom tissue embossed by the method of this invention had a caliper of from about 0.66 to about 0.72 inch which is essentially the same as that of two-ply bathroom tissue embossed with the same pattern which was not separated and recombined after it was embossed.

While a preferred embodiment of apparatus for and a method of embossing non-woven fibrous webs in accordance with this invention have been described in detail, it will be understood that the resulting product is also novel and included in the scope of this invention.

I claim:

1. A process for the production of a soft, absorbent multi-ply embossed towel or fibrous tissue product which comprises forming a multi-ply sheet of unembossed fibrous webs, simultaneously embossing said fibrous webs by passing said multi-ply sheet through the nip of an embossing roll and a back-up roll, separating the embossed multi-ply sheet into separate embossed webs, longitudinally displacing one of said webs of said sheet from another, and recombining said webs into a single multi-ply sheet with the embossments of one web out of register with the embossments of the other by an amount sufficient to prevent nesting of the embossments.

2. A process according to claim 1 wherein the unembossed multi-ply sheet is impressed with bosses of identical size, shape and orientation.

3. A process according to claim 1 wherein the unembossed multi-ply sheet is impressed with bosses arranged in rows skewed at an angle within the range of 15 to 30 degrees with respect to the edge of the sheet in the machine direction.

4. A process according to claim 3 wherein the embossments are spaced in rows across the sheet at an angle within the range of 35 to 50 degrees relative to the cross direction of the sheet.

* * * * *